Patented Sept. 1, 1953

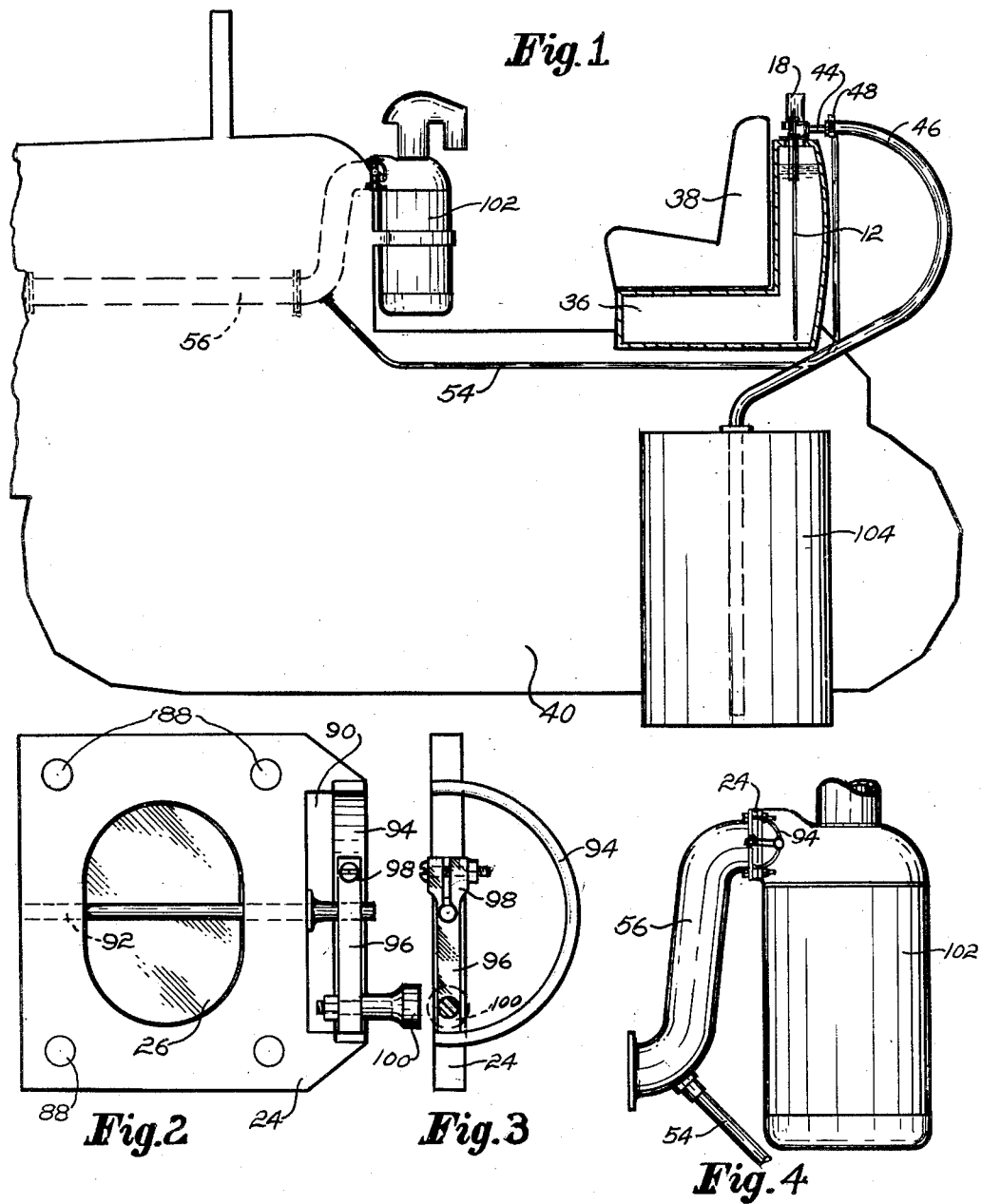

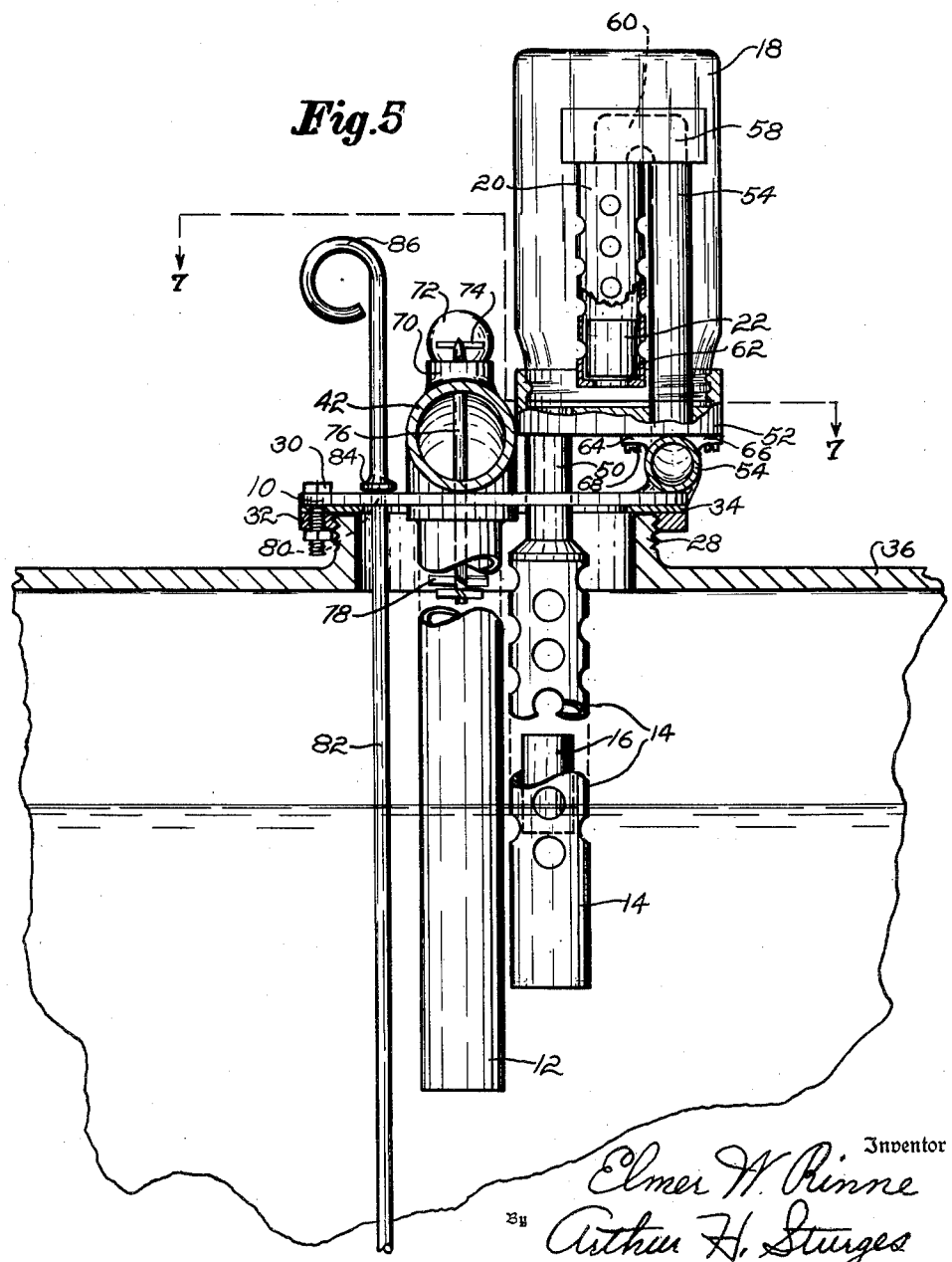

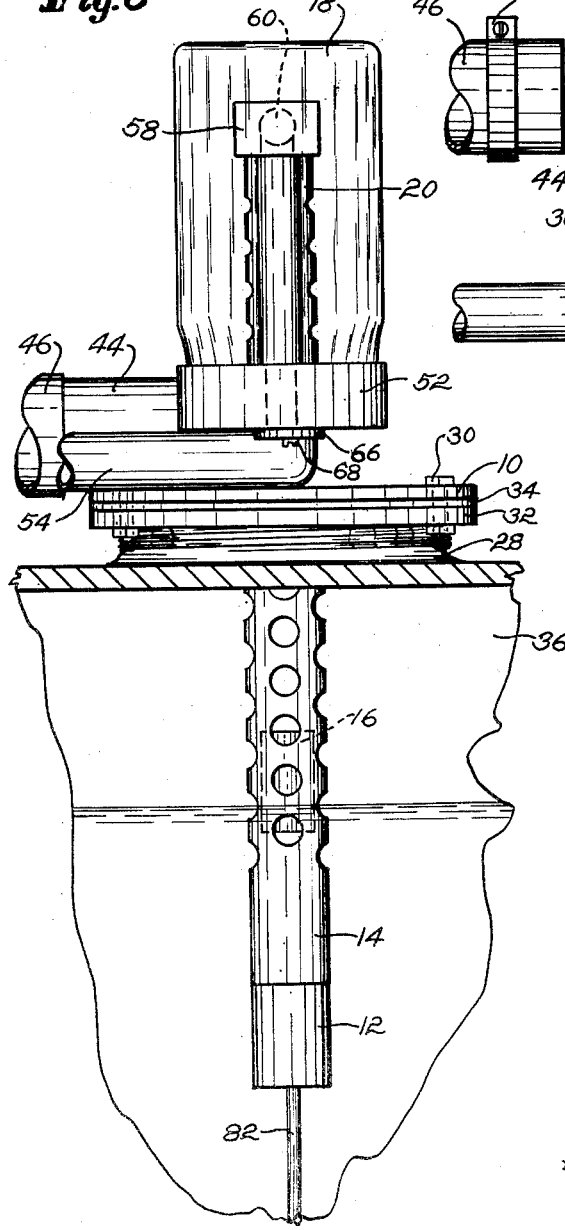

2,650,747

UNITED STATES PATENT OFFICE 2,650,747

FUEL TRANSFERRING APPARATUS

Elmer W. Rinne, Steinauer, Nebr.

Application September 16, 1950, Serial No. 185,313

3 Claims. (Cl. 226—116)

This invention relates to fuel transferring apparatus particularly used in combination with field or farm equipment, and in particular a device for filling the tank of a tractor from a delivery wagon, barrel or the like wherein the vacuum of the intake manifold of the engine of the tractor is used to draw the fuel from a barrel or tank into the fuel tank of the tractor through a perforated tube having a float therein positioned in the tank and also through another similar tube with a float therein in a transparent container positioned on the tank.

The purpose of this invention is to provide a vacuum actuated tank filling device for transferring fuel from a barrel, drum, or tank to the fuel tank of a tractor or implement where the fuel inlet is positioned at a comparatively high elevation wherein means is provided for checking the flow of the fuel when the liquid reaches a predetermined level.

In the conventional tractor particularly of the type having endless treads the fuel supply or inlet neck of the fuel tank is relatively high, sometimes being as much as seven feet from the ground, and at this elevation it is difficult to transfer fuel from a barrel or delivery wagon to the tractor tank. Furthermore with the filling opening at a high elevation it is difficult to tell when the tank is full, and for this reason there is considerable waste of fuel.

With these and other thoughts in mind this invention contemplates apparatus carried by the tractor and attached to the filling neck of the fuel tank thereof, whereby with a hose extended from the device into a barrel of fuel the vacuum of the intake manifold of the engine of the tractor creates suction in the hose which draws the fuel from the barrel into the fuel tank of the tractor through the device.

The object of this invention is, therefore, to provide means for filling fuel tanks of tractors and the like where the filling neck of the tank is positioned at a relatively high elevation and the fuel is contained in a barrel or the like on the ground or in a low truck or wagon.

Another object of the invention is to provide, in a device for filling a fuel tank of an implement or the like by the vacuum of an engine of the implement, means for shutting off the vacuum when the liquid in the tank reaches a predetermined level.

Another object of the invention is to provide a safety device in combination with means for filling a fuel tank of a tractor or the like wherein should a float actuated cut off fail to operate, a visible signal will be given.

A further object of the invention is to provide an automatic filling device for fuel tanks of tractors where the filling neck is positioned at a comparatively high elevation which may be used with tractors now in use without changing the structure thereof.

A still further object of the invention is to provide a fuel tank filling device whereby fuel is transferred from a barrel or the like to the filling neck or connection of a tank at a high elevation which is of a simple and economical construction.

With these and other objects and advantages in view the invention embodies a filling tube carried by a plate attached to a nipple of a tank filling neck, a perforated tube having a float therein also carried by the said plate and having a reduced upper end adapted to be closed by the float, a transparent container positioned above the plate and connected to the upper end of the said perforated tube, a U-shape tube extended upwardly into the transparent container and having a perforated section with a float therein, and a connection from the lower end of the said U-shape tube to the intake manifold of an engine of a tractor upon which the said tank is positioned.

The invention also includes a spinner for indicating that fuel is passing into the fuel tank, a bayonet stick gage for determining the level of fuel in the tank, and means for holding the butterfly valve of the intake manifold to increase the vacuum.

Other features and advantages of the invention will appear from the following description taken in connection with the drawings, wherein:

Figure 1 is a side elevational view showing a tractor in outline, with part broken away, and illustrating a hose extended from a barrel or drum to the fuel tank of the tractor, the fuel tank being shown in section.

Figure 2 is a detail showing a plate in the form of a gasket adapted to be used between the flanges of the air filter and intake manifold of the engine, and in which the butterfly valve of the engine is mounted.

Figure 3 is an end elevational view of the plate shown in Figure 2 illustrating the control means for holding the butterfly valve.

Figure 4 is a detail illustrating the connections of the intake manifold, air filter, and suction line to the tank filling device.

Figure 5 is a side elevational view of the fuel tank filling device with the parts shown on an enlarged scale and with parts shown in section.

Figure 6 is a similar view taken at a right angle to the view shown in Figure 5.

Figure 7 is a sectional plan through the upper part of the filling device taken on line 7—7 of Figure 5.

Referring now to the drawings wherein like reference characters denote corresponding parts the fuel tank filling device of this invention includes a plate 10 upon which the parts are mounted, a filling tube 12, a perforated tube 14 having a float 16 therein, a transparent container 18 having a perforated tube 20 therein, a float 22 in the tube 20, and a plate 24 in which a butterfly valve 26 is journaled.

The plate 10 is positioned upon the upper end of a threaded nipple 28 and secured by bolts 30 to a ring 32 which is threaded on the nipple, with a gasket 34 between the plate and ring. The nipple 28 forms the filling opening or neck of a fuel tank 36, which, as illustrated in Figure 1, is positioned below and behind a seat 38 of a tractor 40.

The filling tube 12 extends downwardly from a pipe fitting 42 mounted, preferably by welding, in the plate 10, and the upper end of the fitting is provided with a nipple 44 to which a hose 46 is attached by a clamp 48, as shown in Figure 7. A vertically disposed tube 50 is also secured in the plate 10 and the lower end of this tube is secured to the upper end of the perforated tube 14 providing supporting means therefor. The tube 14 is of a larger diameter than the tube 50 whereby the float 16 is adapted to seat against the end of the tube 50 to close the tube and thereby shut off the suction of the vacuum when the float reaches the upper end of the tank. The lower end of the perforated tube 14 is closed so that the float is retained therein.

The tube 50 extends upwardly into a cap 52 into which the threaded neck of the transparent container 18 is threaded and the cap is mounted on and in spaced relation to the plate 10 by a pipe 54, one end of which extends upwardly through the cap 52 and into the container 18, and the horizontal part of which extends to the intake manifold 56 of the engine. A fitting 58 is secured on the upper end of the section of the pipe positioned in the transparent container and the perforated tube 20 is secured in and extends downwardly from the fitting 58, as shown in Figure 5. The fitting 58 is provided with a passage 60, as shown in dotted lines, connecting the tube 20 to the pipe 54, and the float 22 is positioned to close the end of the passage should the level of liquid in the transparent container reach this point. The lower end of the tube 20 is provided with an inner flange 62 to retain the float therein, and the pipe 54 may be provided with flanges 64 and 66 through which the cap 52 may be secured thereto by screws 68.

The pipe fitting 42 is provided with a boss 70 in which a transparent bulb 72 is secured and an arm 74 on the upper end of a vertically disposed shaft 76, which is journaled in the fitting, shows through the bulb whereby as liquid is passing through the filling tube 12 a propeller 78 on the lower end of the shaft rotates the shaft and arm 74 so that an operator may readily determine whether or not the fuel is flowing into the fuel tank.

The plate 10 is also provided with an opening 80 in which a bayonet stick gage 82 is positioned whereby the level of liquid in the tank may readily be determined. The gage 82 is provided with a collar 84 which seals the opening 80 and a finger ring 86 is positioned on the upper end.

The plate 24 in which the butterfly valve 26 is journaled is provided with bolt holes 88 and a recess 90 in one end is positioned to receive the end of a shaft 92 on which the valve member is mounted. A semi-circular band 94 secured to the plate, is positioned at one side of the recess and an arm 96 secured to the shaft 92 by a clamp 98 is positioned whereby the outer end thereof is in frictional engagement with the band to hold the butterfly valve member closed or in adjusted positions to regulate the vacuum pressure. The arm 96 is provided with a knob 100 by which it may be moved from one position to another.

With the parts arranged in this manner the plate 24 is installed between the end of the intake manifold connection and the air filter 102 and with the hose 46 extended to a barrel or tank 104 the engine of the tractor is started and the suction of the intake manifold draws air from the fuel tank through the pipe 54 and the perforated tubes 20 and 14, and when the air is exhausted fuel is drawn from the barrel 104 through the hose 46 into the tank. This action continues until the float 16 which is carried upwardly by the liquid in the tank, engages the lower end of the tube 50 and shuts off the vacuum.

Should the float 16 fail to seat properly, due to foreign matter, rust or corrosion, the filling action will continue until the float 22 in the tube 20 in the transparent container 18, which is now being filled with the fuel, reaches the end of the passage 60, and thereby shuts off the vacuum.

The transparent container also provides visible means whereby the operator may know that the fuel tank is filled with fuel, and with this combination of safety devices there is very little possibility of running the fuel tank over.

From the foregoing description it is thought to be obvious that fuel transferring apparatus constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

1. In a fuel transferring device, the combination which comprises a fuel tank, and a hose adapted to extend from the fuel tank to a supply tank, a transparent container positioned above the fuel tank, a tube extended from the transparent container into the fuel tank, the end of said tube positioned in the fuel tank having perforations therein and the upper end thereof having an outlet opening of reduced diameter, a float positioned in said tube for closing said outlet opening when fuel in the tank reaches a predetermined level, a vacuum connection from said transparent container to the said intake manifold of the engine, and means in said transparent container for closing the vacuum connection upon failure of said float in the tube in the fuel tank to close the connection.

2. In a fuel transferring device, the combination which comprises a fuel tank, a hose adapted to extend from the fuel tank to a supply tank, a transparent container positioned above the fuel tank, a tube extended from the transparent container into the fuel tank, the end of said tube positioned in the fuel tank having perforations therein and the upper end thereof having an outlet opening of reduced diameter, a float in said tube and positioned to close said outlet opening when fuel in the tank reaches a predetermined level, an inverted U-shape tube having parallel legs with perforations in one of said legs positioned in said transparent container, said leg of the U-shape tube having perforations therein having an opening of reduced diameter in the upper end, a float in the perforated leg of said U-shape tube positioned to close the opening of reduced diameter therein when liquid in the transparent container reaches a predetermined level, and a pipe for connecting said U-shape tube to suction means.

3. A fuel transferring device for use on a fuel tank having a filling neck, a mounting plate adapted to be secured on the filling neck of the fuel tank, a filling tube extended through the mounting plate with an outer end extended from the plate, a filling hose extended from the extended end of the filling tube, a transparent container carried by the said mounting plate, a perforated tube having an opening of reduced diameter in the upper end suspended from the mounting plate downwardly into the fuel tank and extended upwardly into the said transparent container, a float in said perforated tube positioned to close the opening of reduced diameter in the upper end of the tube when liquid in the fuel tank reaches a predetermined level, an inverted U-shape tube having parallel legs positioned in said transparent container, one of the legs of the U-shape tube being perforated and having an opening of reduced diameter in the upper end, a float in the perforated leg of the U-shape tube positioned to engage the opening of reduced diameter therein to cut off suction through the tube, and means connecting the other leg of the said inverted U-shape tube to suction means.

ELMER W. RINNE.

References Cited in the file of this patent

UNITED STATES PATENTS

| Number | Name | Date |
|---|---|---|
| 1,413,796 | Shelor | Apr. 25, 1922 |
| 1,673,348 | Czerner | June 12, 1928 |
| 2,227,611 | Walleser | Jan. 7, 1941 |
| 2,325,274 | Pye | July 27, 1943 |